Feb. 11, 1941.  H. F. BENNETT  2,231,699
TELEPHOTO OBJECTIVE
Filed Oct. 28, 1939   2 Sheets-Sheet 1 f = 100 mm.    f/3.8

| LENS | GLASS | RADII | SPACINGS |
|---|---|---|---|
| I | $N_D$ = 1.498<br>$\nu$ = 67.0 | $R_1$ = +29.18 | $t_1$ = 7.3 |
| II | $N_D$ = 1.664<br>$\nu$ = 35.9 | $R_2$ = −47.45<br>$R_3$ = ∞ | $t_2$ = 2.1<br>S = 39.5 |
| III | $N_D$ = 1.516<br>$\nu$ = 64.1 | $R_4$ = −16.45<br>$R_5$ = +52.50 | $t_3$ = 2.9 |
| IV | $N_D$ = 1.639<br>$\nu$ = 55.5 | $R_6$ = −33.58 | $t_4$ = 5.5 |

Harold F. Bennett  Inventor

By

Attorney

Feb. 11, 1941.　　　H. F. BENNETT　　　2,231,699
TELEPHOTO OBJECTIVE
Filed Oct. 28, 1939　　　2 Sheets-Sheet 2 f = 100 mm.　　　f/3.8

| LENS | GLASS | RADII | SPACINGS |
|---|---|---|---|
| I | $N_D$ = 1.516<br>$\nu$ = 64.1 | $R_1$ = +29.17 | $t_1$ = 6.4 |
| II | $N_D$ = 1.664<br>$\nu$ = 35.9 | $R_2$ = −47.58 | $t_2$ = 1.5 |
|  |  | $R_3$ = +494.02 | S = 41.8 |
| III | $N_D$ = 1.516<br>$\nu$ = 64.1 | $R_4$ = −15.95 | $t_3$ = 1.5 |
|  |  | $R_5$ = +41.10 |  |
| IV | $N_D$ = 1.639<br>$\nu$ = 55.5 | $R_6$ = −32.58 | $t_4$ = 5.5 |

Inventor
Harold F. Bennett

By

Attorney

Patented Feb. 11, 1941

2,231,699

UNITED STATES PATENT OFFICE 2,231,699

TELEPHOTO OBJECTIVE

Harold F. Bennett, Rochester, N. Y., assignor to Eastman Kodak Company, Rochester, N. Y., a corporation of New Jersey Application October 28, 1939, Serial No. 301,848

11 Claims. (Cl. 88—57)

This invention relates to telephoto objectives such as may be used on a photographic camera.

Telephoto objectives consist of a positive component spaced in front of a negative component and usually suffer from a large amount of distortion. It is the primary object of the present invention to provide a telephoto objective having practically no distortion.

It is a secondary object of the invention to provide a telephoto objective having a larger relative aperture than hitherto available with such a high degree of correction for distortion.

According to the invention, a telephoto objective is made up comprising a positive front component consisting of at least two elements and a negative rear component having its outer surfaces concave to the front component with radii of curvature between .1 F and .5 F where F is the focal length of the objective and having at least two elements cemented together with the cemented surface convex to the front component. In the most preferred embodiment the rear component consists of these two elements only, the front surface of the component has a radius of curvature about ⅛ F, and the rear surface has a radius of curvature of about ⅓ F. I have found that distortion is reduced to a minimum if the index of refraction of the glass immediately following this cemented surface exceeds that of the glass immediately preceding this surface by at least .07 and preferably by at least 1. This cemented surface is the fundamental part of my invention and its radius of curvature should be between ¼ F and F, preferably about ½ F.

With this invention, not only am I able to reduce distortion to a minimum but also to provide a lens having a relative aperture of f/3.8 whereas prior lenses of this type had at best a relative aperture of about f/6 or f/7.

Although the invention is not primarily concerned with the front component of the system, I have found it preferable to have this component consisting of a bi-convex element cemented to the front of a concave plano or bi-concave element and to have a high break in refractive index at this cemented surface also.

In general, I also prefer to have the two components separated by more than ¼ of the focal length (preferably less than ¾ of the focal length) and to have each component separately slightly undercorrected for color.

In the simplest and most satisfactory form of my invention, the rear component consists entirely of a bi-concave element cemented to the front of a bi-convex element with the break in refractive index greater than .1 and the break in dispersive index less than 15 and preferably less than 10.

Other objects and advantages of the present invention will be apparent from the following description when read in connection with the accompanying drawings, in which.

Figure 1:
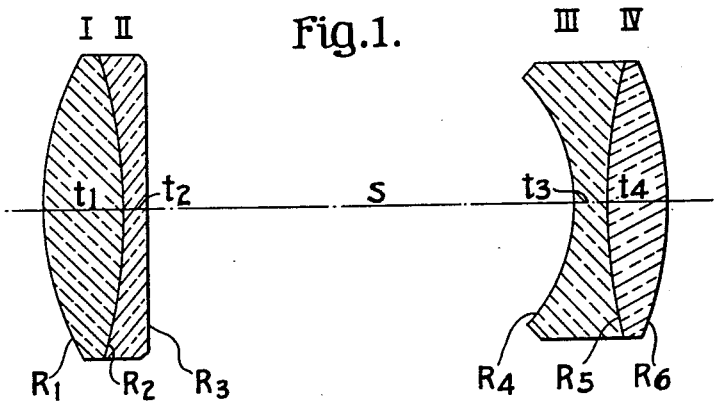
Fig. 1 shows one embodiment of my invention.
Figure 2:
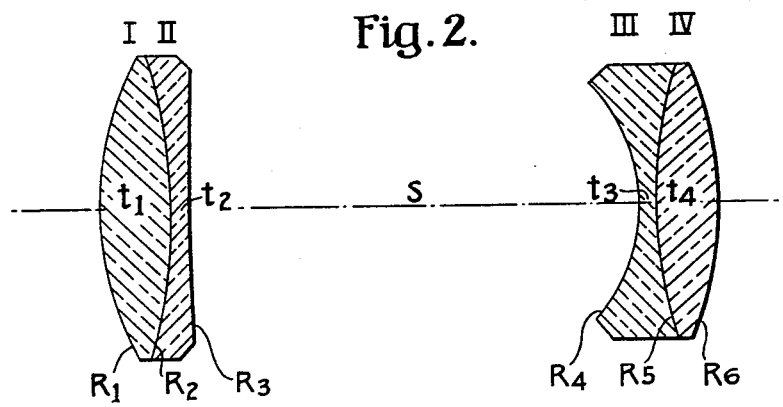
Fig. 2 shows a slight modification of the arrangement shown in Fig. 1.

In Figs. 1 and 2 the telephoto objectives shown in cross section have the following characteristics:

Figure 1

$f = 100$ mm.  $f/3.8$

| Lens | Glass | Radii | Spacings |
|---|---|---|---|
| I | $N_D = 1.498$, $\nu = 67.0$ | $R_1 = +29.18$ mm. $R_2 = -47.45$ | $t_1 = 7.3$ mm. |
| II | $N_D = 1.664$, $\nu = 35.9$ | $R_3 = \infty$ | $t_2 = 2.1$ |
| III | $N_D = 1.516$, $\nu = 64.1$ | $R_4 = -16.45$ | $S = 39.5$ $t_3 = 2.9$ |
| IV | $N_D = 1.639$, $\nu = 55.5$ | $R_5 = +52.50$ $R_6 = -33.58$ | $t_4 = 5.5$ |

Figure 2

$f = 100$ mm.  $f/3.8$

| Lens | Glass | Radii | Spacings |
|---|---|---|---|
| I | $N_D = 1.516$, $\nu = 64.1$ | $R_1 = +29.17$ mm. $R_2 = -47.58$ | $t_1 = 6.4$ mm. |
| II | $N_D = 1.664$, $\nu = 35.9$ | $R_3 = +494.02$ | $t_2 = 1.5$ |
| III | $N_D = 1.516$, $\nu = 64.1$ | | $S = 41.8$ |
| IV | $N_D = 1.639$, $\nu = 55.5$ | $R_4 = -15.95$ $R_5 = +41.10$ $R_6 = -32.58$ | $t_3 = 1.5$ $t_4 = 5.5$ |

These lenses are highly corrected for all lens aberrations and particularly for distortion which is the most difficult one to remove from telephoto systems. In the development of this lens, my efforts were mainly in the direction of minimizing distortion and I was well satisfied in this respect even before I made the additional discovery that an aperture greater than f/4 was possible with this system. I have found that the peculiar advantages are primarily due to the cemented surface in the rear component and the break in refractive index at this surface. Of course, it may be possible to add additional elements either cemented or spaced to either of the components without departing from the spirit of the present invention, but the arrangements shown have proven to be the most satisfactory.

Having thus described two embodiments of my invention, I wish to point out that it is not limited to the specific structures shown but is of the scope of the appended claims.

What I claim and desire to secure by Letter Patent of the United States is:

1. A telephoto objective comprising a positive front component consisting of at least two elements and a negative rear component having its outer surfaces concave to the front component with radii between .1 F and .5 F where F is the focal length of the objective and having a cemented surface convex to the front component, the index of refraction of the glass immediately following the cemented surface exceeding that immediately preceding that surface by at least .07, the cemented surface having a radius of curvature between ¼ F and F.

2. A telephoto objecitve according to claim 1 in which the front component consists of a bi-convex element cemented to the front of a negative element.

3. A telephoto objective according to claim 1 in which the front component consists of a bi-convex element cemented to the front of a bi-concave element.

4. A telephoto objective according to claim 1 in which the front component consists of a bi-convex element cemented to the front of a negative element having an index of refraction at least .1 greater than that of the bi-convex element.

5. A telephoto objective according to claim 1 in which each component is slightly undercorrected for color.

6. A telephoto objective according to claim 1 in which the rear component consists entirely of a bi-concave element cemented to the front of a bi-convex element.

7. A telephoto objective according to claim 1 in which the two components are spaced by an axial distance between ¼ F and ¾ F.

8. A telephoto objective according to claim 1 in which the dispersive index of the glass following the cemented surface is less than that preceding the cemented surface by at most 15.

9. A telephoto objective comprising a positive front component consisting of at least two elements and a negative rear component consisting of a bi-concave front element whose front surface has a radius of curvature about ⅙ F where F is the focal length of the objective and whose rear surface has a radius of curvature between ¼ F and ¾ F and a bi-convex element cemented to the rear of the bi-concave element and having a rear surface with a radius of curvature about ⅓ F, said bi-convex element having an index of refraction which exceeds that of said bi-concave element by at least .07 and a dispersive index which is less than that of said bi-concave element by at most 15.

10. A telephoto objective according to claim 9 wherein the difference in index of refraction is at least .1 and wherein the difference in dispersive index is at most 10.

11. A telephoto objective consisting of two components spaced by an axial distance between ¼ F and ¾ F where F is the focal length of the objective, the front component consisting of a bi-convex element cemented to the front of a negative element whose index of refraction exceeds that of the bi-convex element by at least .1, the rear component consisting of a bi-concave element cemented to the front of a bi-convex element whose index of refraction exceeds that of the bi-concave element by at least .1 and whose dispersive index is less than that of the bi-concave element by at most 15, the outer surfaces of the rear component having radii of curvature between .1 F and .5 F, the cemented surface in this rear component having a radius of curvature of between ¼ F and F.

HAROLD F. BENNETT.

CERTIFICATE OF CORRECTION.

Patent No. 2,231,699.  February 11, 1941.

HAROLD F. BENNETT.

It is hereby certified that error appears in the printed specification of the above numbered patent requiring correction as follows: Page 1, first column, line 32, for the numeral "1" read --.1--; and that the said Letters Patent should be read with this correction therein that the same may conform to the record of the case in the Patent Office.

Signed and sealed this 22nd day of April, A. D. 1941.

(Seal)

Henry Van Arsdale
Acting Commissioner of Patents.